Sept. 14, 1965 C. A. SECKERSON ETAL 3,205,760

PLASTIC EMBLEM CLIP

Original Filed Jan. 30, 1963

Inventors
Clifford A. Seckerson
Paul C. R. Pernberg
by Malcolm W. Fraser
attorney

PLASTIC EMBLEM CLIP

Original Filed Jan. 30, 1963 2 Sheets-Sheet 2

Inventors
Clifford A. Seckerson
Paul C. R. Vernberg
by Malcolm W. Fraser
attorney United States Patent Office 3,205,760 Patented Sept. 14, 1965

3,205,760
PLASTIC EMBLEM CLIP

Clifford Alexander Seckerson, Iver Heath, and Paul Carl Roger Fernberg, Farnham Common, England, assignors to United-Carr Incorporated, a corporation of Delaware Continuation of application Ser. No. 255,035, Jan. 30, 1963. This application Jan. 8, 1965, Ser. No. 425,680
Claims priority, application Great Britain, Feb. 9, 1962, 5,141/62
2 Claims. (Cl. 85—82)

This case is a continuation of United States application Serial No. 255,035, filed January 30, 1963, and now abandoned.

The present invention relates to an assembly of a cylindrical pin secured in an apertured panel with the aid of a resilient rivet.

An object of the present invention is to provide a quick and easy device for removably securing a member, such as an emblem, which is provided with one or more integral pins, within an aperture in a panel which may for instance form a port of a vehicle body.

According to the present invention there is provided an assembly of a cylindrical pin secured in a circular hole in a panel with the aid of a resilient, headed rivet having a tubular shank which is externally cylindrical and is formed with internal longitudinal ribs, the external unstressed radius of the shank being such that the shank can be easily pushed through the hole in the panel and the radius of the pin lying between the external radius and the minimum internal radius of the shank of the rivet when unstressed.

Rivets for use in such an assembly are also within the scope of the invention.

Preferred forms of the invention will now be described with reference to the accompanying diagrammatic drawings, in which.

Figure 1:
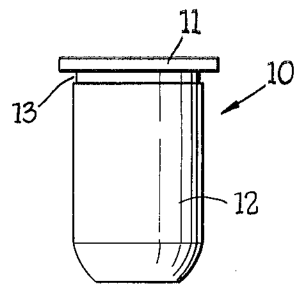
FIGURES 1 and 2 are respectively a side elevation and plan view of a rivet.
Figure 2:
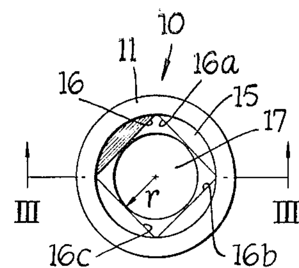
Figure 3:
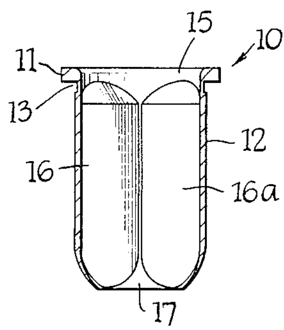
FIGURE 3 is a section on the line III—III of FIGURE 2.

In FIGURES 1 to 3 a rivet which is formed from any suitable resilient material such as a synthetic plastic, is indicated generally at 10. It has a circular head 11 and a tubular cylindrical shank 12 extending from and being of smaller external radius than the head 11. The head and shank are formed with an axial through bore, and immediately under the head the shank is formed with an external annular groove 13.

As shown most clearly in FIGURE 2 the inner surface 15 of the head is circular in cross section and the inner surface of the shank 12 is formed with four flats which constitute ribs 16, *16a*, *16b* and *16c*, running longitudinally of the shank.

The end of the shank 12 remote from the head 11 is open ended, thus forming a circular aperture 17. The radius of the aperture 17 is smaller than the radius of the inner surface 15 of the head 11 and the wall of the cylindrical shank 12 tapers externally adjacent the end of the shank remote from the head 11 inwardly towards the aperture 17.

Figure 6:
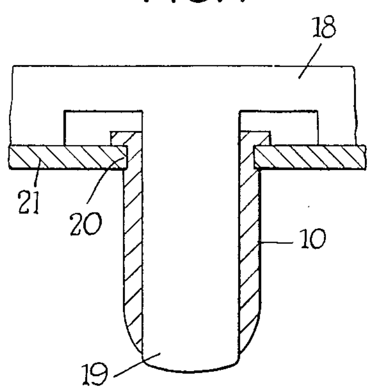
FIGURE 6 is a side elevation, partly in section showing the rivet of FIGURES 1 to 3 used to secure a pin within an aperture in a panel.

The rivet 10 is used, as shown in FIGURE 6, to attach a member 18, which may for instance be an emblem and which is formed with a protruding cylindrical pin 19, in an aperture 20 in a panel 21 which may form a part of the body of a vehicle.

In order to make the assembly shown in FIGURE 6 the tubular rivet 10 is inserted into the aperture 20 in the panel 21, the radius of the aperture being such that the shank 12 can be passed through the aperture until the groove 13 sits in the aperture 20, whereupon the pin 19 is then pressed home, as shown, into the tubular rivet 10.

The dimensions of the pin and the rivet are such that the inner surface 15 of the head of the rivet, which is circular in cross-section, gives a clearance to, and acts as a lead-in for the pin which is then a force fit into the internally ribbed hollow shank 12. The pin 19 thus expands the shank 12 so that the external radius of the shank becomes greater than that of the aperture 20 in the panel, and so that the rivet and pin cannot be easily removed from the aperture.

In the assembled position the end of the pin 19 projects through the shank aperture 17 which, being circular and (when unstressed) of smaller radius than the pin 19, provides a water tight seal against the pin.

It will be seen that a seal is obtained between the shank 12 and the panel 21 at the aperture 20 therein when the shank is forcibly expanded by the pin, and that a second seal is obtained between the pin and the shank where the circular aperture 17 in the shank grips the pin.

The ribs 15 on the internal surface of the shank provide a more effective expansion of the shank and a better grip on the pin is obtained.

The longitudinal ribs on the shank may have an internal cross-section of any shape which will ensure the necessary expansion of the shank and grip on the pin.

Figure 4:
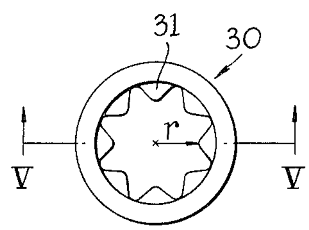
FIGURES 4 and 5 are respectively a plan view of a modification of the rivet shown in FIGURES 1 to 3, and a section taken on the line V—V of FIGURE 4.
Figure 5:
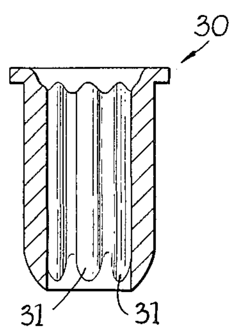

Thus in FIGURES 4 and 5 there is indicated generally at 30 a rivet which is similar in every respect to the rivet 10 of FIGURES 1 to 3 except that the shank is formed with internal longitudinal ribs 31 which provide the necessary interference grip on a pin in the same manner as that described with reference to the rivet 10. The rivet 30 serves the same purpose as the rivet 10 and is assembled in the same manner.

Figure 7:
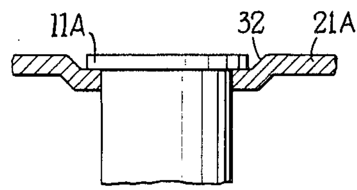
FIGURES 7 and 8 are elevations, each partly in section, of two rivets having countersunk heads.
Figure 8:
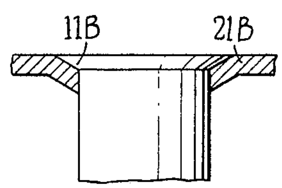
Figure 9:
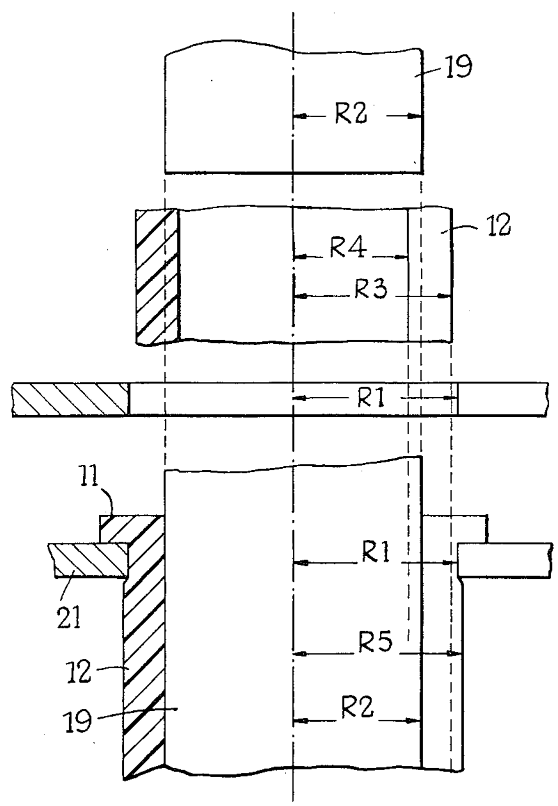
FIGURE 9 is a diagram illustrating the change in diameter of the rivet before and after upsetting.

As shown in FIGURE 7, the head 11A of the rivet is recessed into a countersunk depression 32 in a panel 21A. In FIGURE 8 the head 11B of the rivet is of countersink shape to fit into a corresponding depression in the panel 21B. Such countersinking is used where the member 18 (FIGURE 6) is too small to carry undercutting as at 33.

The essential dimensions of the pin, rivet and aperture are illustrated in FIGURE 7. In the upper part of this composite diagram the pin 10 is shown as having a radius R2, the external radius of the shank of the rivet is R3 and its minimum internal radius is R4. Here the rivet is shown in its unstressed condition. The minimum radius of the shank is also shown at R4 in FIGURES 2 and 4. In fact this dimension is the radius of the imaginary cylindrical envelope which touches the inside of the ribs 15 (FIGURE 2) or 31 (FIGURE 4). The radius of the aperture in the panel is shown at R1. The radius of pin lies between the internal and external radii of the shank.

Referring now to the lower part of FIGURE 7, which shows the pin and rivet assembled in the aperture, it will be seen that the internal unstressed radius R4 of the shank has been expanded to that of the pin, R2, whilst the external unstressed radius R3 of the shank has been expanded to a value R5 which is greater than the radius R1 of the aperture.

What we claim is:

1. A resilient, synthetic plastic tubular sleeve for fastening, in cooperation with a pin, an article to an apertured support, said sleeve including an enlarged head and a cylindrical shank depending from said head, said head and shank being formed with an axial through bore, defining an internal wall, said internal wall in said head defining a circle, said internal wall in said shank providing four flat axially extending surfaces, and defining geometric square in horizontal cross section, the length of the diagonal of said square being substantially equal to the diameter of the bore in said head, said internal wall in the shank end remote from said head being circular and having a diameter substantially equal to the shortest distance between the sides of said square, said flat surface and said circular surfaces being joined by inclined surfaces and said sleeve having a circular groove formed on the external surface thereof adjacent to said head, said external surface defining a circular figure in cross section and the wall of said aperture in said support being engageable in the groove formed in said tubular sleeve with said sleeve extending beyond the area defined by said aperture in said support.

2. A resilient, synthetic plastic tubular sleeve for fastening, in cooperation with a pin, an article to an apertured support, said sleeve including an enlarged head and a cylindrical shank depending from said head, said head and shank being formed with an axial through bore, defining an internal wall, said internal wall in said head defining a circle, said internal wall in said shank providing four flat axially extending surfaces, and defining a geometric square in horizontal cross section, the length of the diagonal of said square being substantially equal to the diameter of the bore in said head, said internal wall in the shank end remote from said head being circular and having a diameter substantially equal to the shortest distance between the sides of said square, said flat surface and said circular surfaces being joined by inclined surfaces, said external surface defining a circular figure in cross section and the wall of said aperture in said support being engageable on the external surface of said tubular sleeve with said sleeve extending beyond the area defined by said aperture in said support.

No references cited.

EDWARD C. ALLEN, *Primary Examiner.*